United States Patent [19]

Estes, Sr.

[11] Patent Number: 5,054,151
[45] Date of Patent: Oct. 8, 1991

[54] LEAF SWEEPER

[76] Inventor: Jerry C. Estes, Sr., 107 McCullouch Rd., Louisville, Miss. 39339

[21] Appl. No.: 543,427

[22] Filed: Jun. 26, 1990

[51] Int. Cl.$^5$ .............................................. E01H 1/04
[52] U.S. Cl. ....................................... 15/79.2; 15/82; 15/179; 15/194; 16/111 A; 56/400.02; 56/DIG. 12; 172/359; 180/19.2; 280/442
[58] Field of Search ...................... 15/52.1, 79.1, 79.2, 15/82, 83, 194, 179; 16/111 A; 56/14.9, 16.4, 199, 327.1, 400.02, 400.08, 400.2, DIG. 12; 172/35, 42, 43, 124, 358, 359, 533, 544; 180/19.2, 350; 280/47.371, 442

[56] References Cited

U.S. PATENT DOCUMENTS

| | | | |
|---|---|---|---|
| 606,248 | 6/1898 | Smith | 15/79.1 |
| 666,689 | 1/1901 | Phillips | 56/400.02 |
| 1,313,200 | 8/1919 | Mundy et al. | 172/358 |
| 1,846,507 | 2/1932 | Boring | 15/82 |
| 2,194,297 | 3/1940 | Drumm | 15/83 |
| 2,548,676 | 4/1951 | Milz et al. | 15/82 |
| 2,941,223 | 6/1960 | Klauer | 15/79.2 |
| 3,125,844 | 3/1964 | Beyer | 56/400.02 |
| 3,624,853 | 11/1970 | Kromer | 15/82 |

FOREIGN PATENT DOCUMENTS

| | | | |
|---|---|---|---|
| 1297376 | 6/1969 | Fed. Rep. of Germany | 172/42 |
| 544586 | 9/1922 | France | 15/82 |
| 1368971 | 6/1964 | France | 172/42 |
| 2307454 | 11/1976 | France | 172/42 |
| 716280 | 10/1966 | Italy | 15/82 |
| 973993 | 11/1964 | United Kingdom | 56/400.02 |

Primary Examiner—Harvey C. Hornsby
Assistant Examiner—Mark Spisich
Attorney, Agent, or Firm—Brady, O'Boyle & Gates

[57] ABSTRACT

A leaf sweeper having a sweeper portion including engine driven, flexible, rotary tines mounted on an engine support frame pivotally connected about a vertical axis to a wheeled main frame. A steering linkage is connected between the engine support frame and wheeled main frame for moving the sweeper portion about the vertical axis through an arc on either side of the longitudinal axis of the wheeled main frame, and a locking control mechanism is connected between the steering linkage and the wheeled main frame for holding the sweeper portion in a selected position relative to the longitudinal axis of the wheeled main frame.

10 Claims, 3 Drawing Sheets

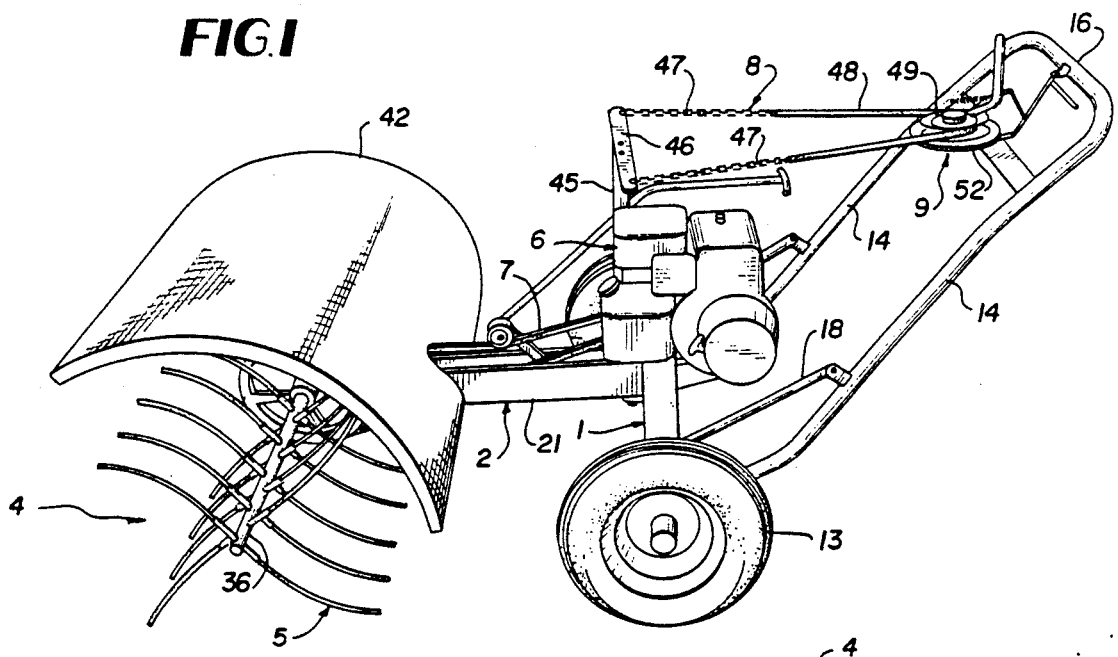

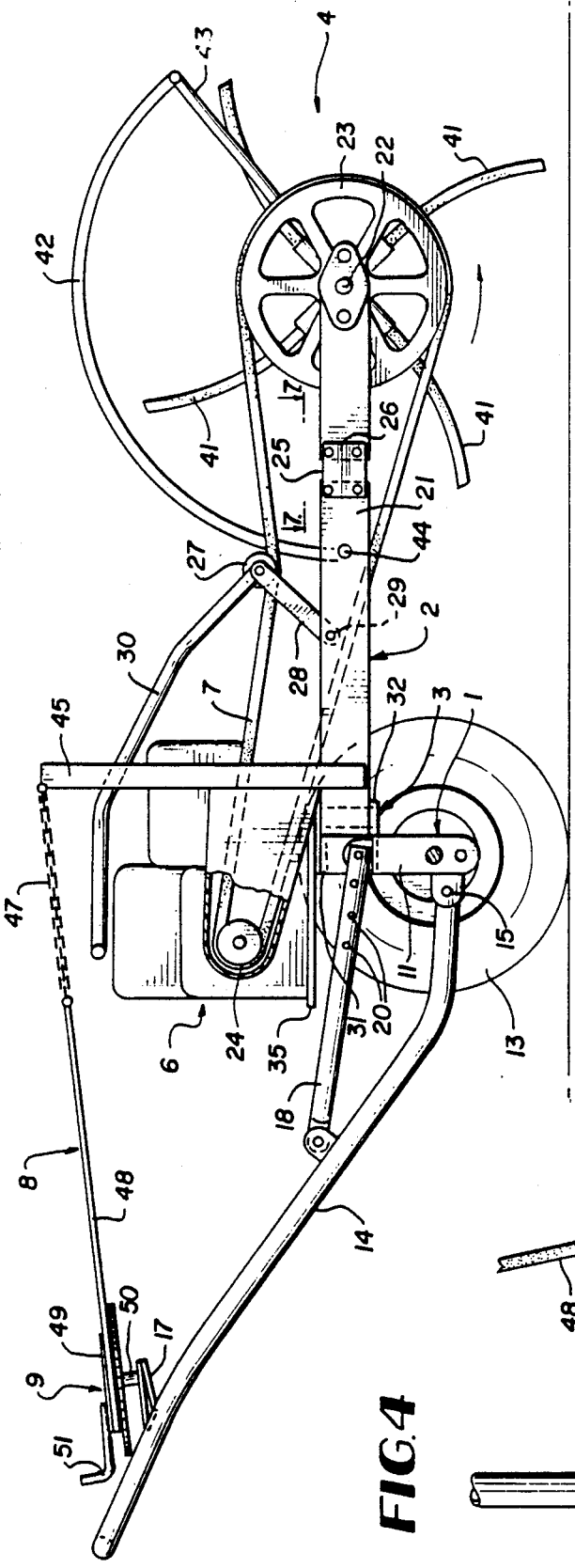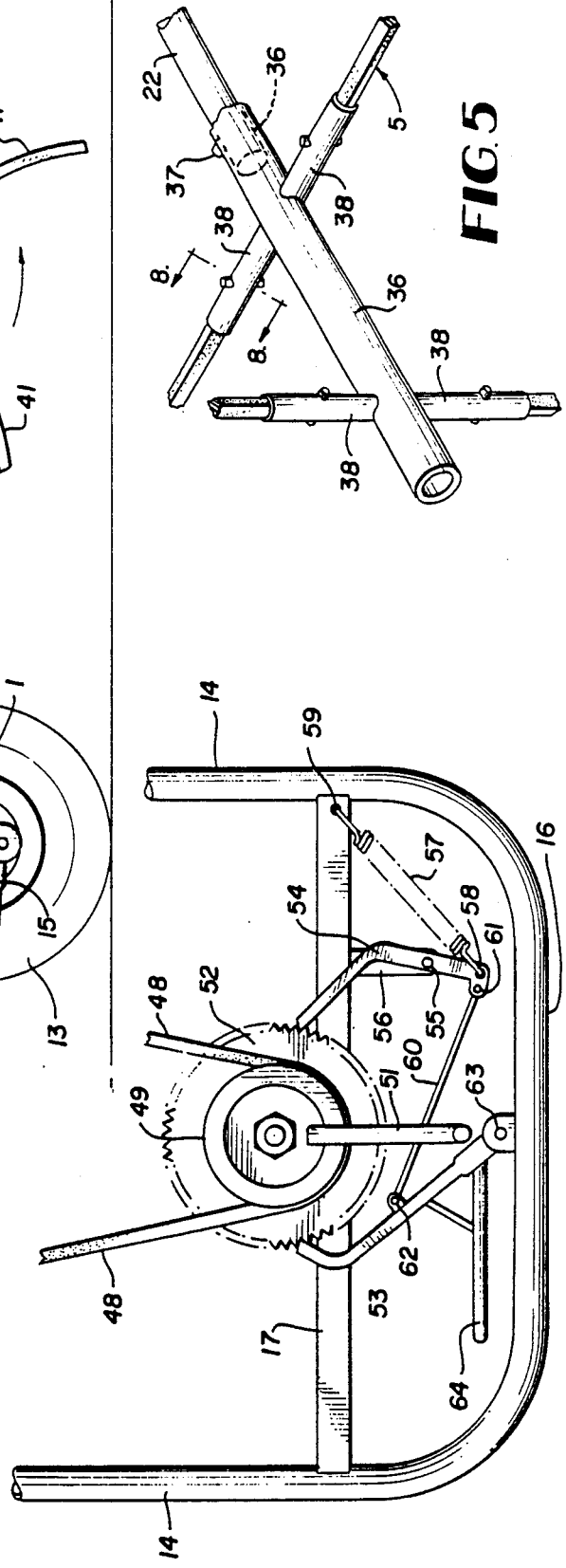

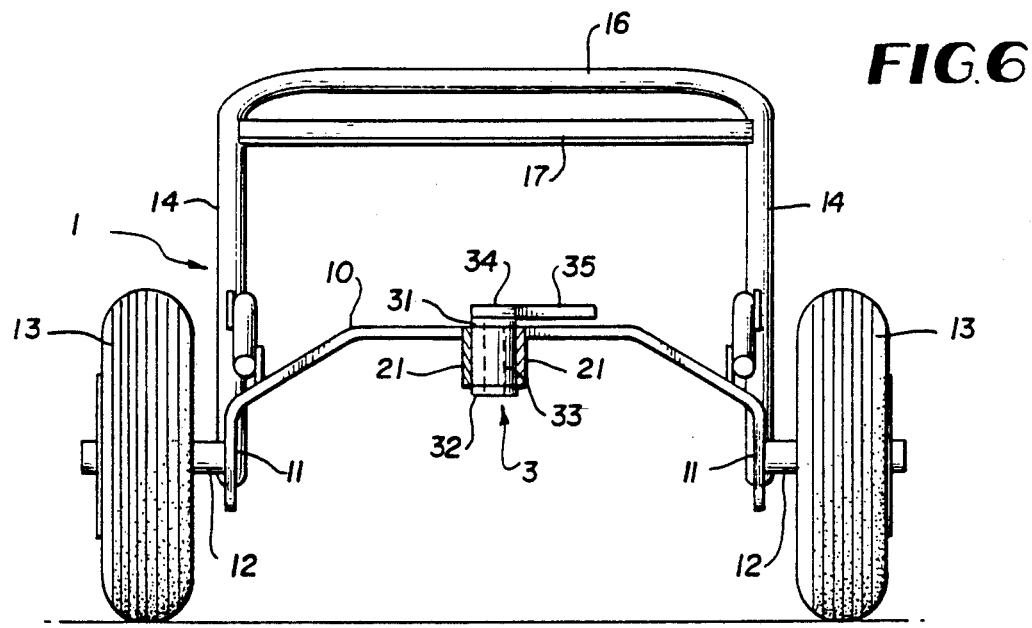
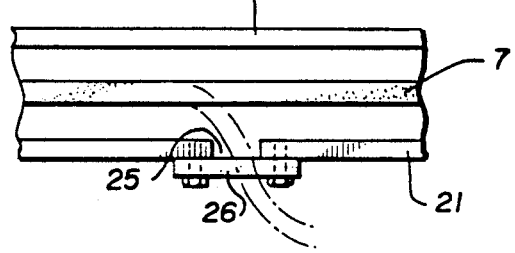
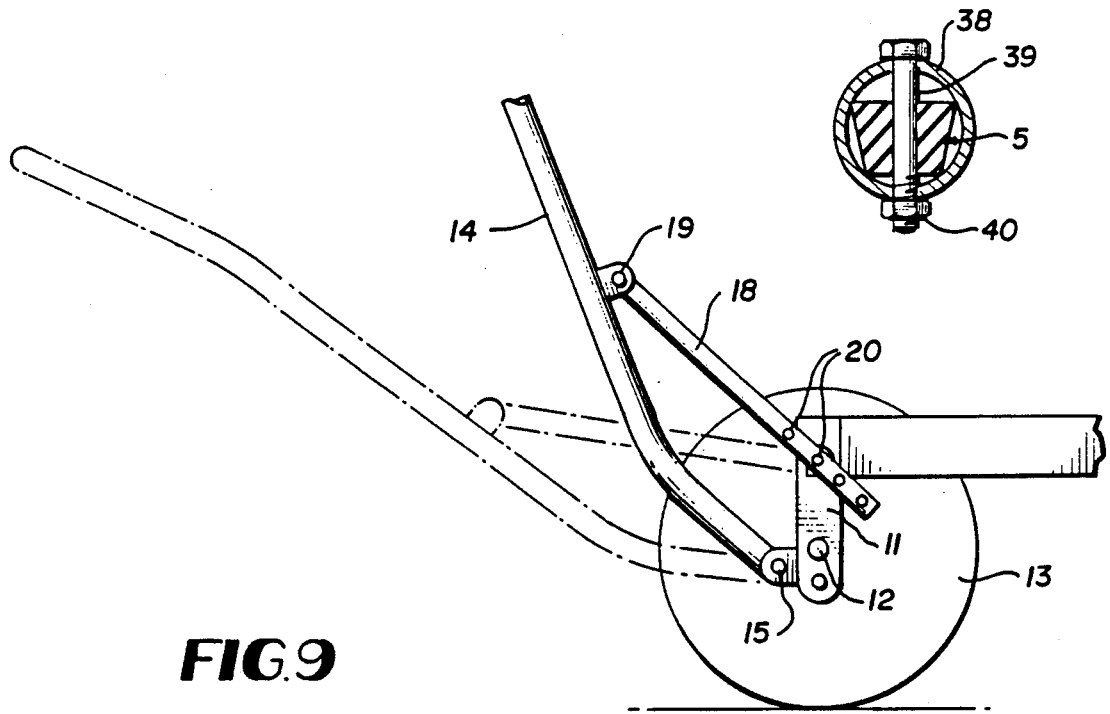

LEAF SWEEPER

BACKGROUND OF THE INVENTION

The conventional manner of raking leaves, and other yard debris is to employ a rake and manually rake the leaves off the yard. While manually raking leaves can be easily accomplished on small yards, it becomes quite a chore on large yards.

Leaf blowers are commonly used to quickly remove leaves from large ground areas. While leaf blowers are satisfactory for their intended purpose, there is no engagement of a tine with the ground, as there is with a rake; accordingly, there is no scarifying effect on the ground to remove embedded leaves and other debris, to thereby enhance the health and growth of the grass being raked.

In order to provide the quickness of a leaf blower while maintaining the scarifying effect of a manual rake, the mobile, powered leaf sweeper of the present invention has been devised which comprises, essentially, a wheeled main frame and an engine support frame pivoted on a vertical axis to the wheeled main frame. A sweeper portion having a plurality of flexible rotary tines is mounted on the forward end portion of the engine support frame, and an internal combustion engine is mounted on the rearward portion of the engine support frame. A drive belt is connected between the engine and sweeper portion for rotating the tines. A steering linkage is operatively connected between the wheeled main frame and the engine support frame, and a locking control mechanism is operatively connected between the wheeled frame and steering linkage, whereby the sweeper portion can be maintained in a desired position relative to the longitudinal axis of the wheeled main frame.

By the construction and arrangement of the powered leaf sweeper of the present invention, the engine drives the tines in a rotary direction to thereby push or sweep the leaves forwardly of the machine while the operator pushes the sweeper over the ground to be raked, whereby leaves can be quickly swept from the ground, while the ends of the flexible tines brush the ground.

BRIEF DESCRIPTION OF THE DRAWINGS

FIG. 1 is a perspective view of the leaf sweeper of the present invention;

FIG. 2 is a top plan view of the sweeper showing the sweeper or rake portion being pivoted through an arc on each side of the longitudinal axis of the wheeled frame;

FIG. 3 is a view taken along line 3—3 of FIG. 2;

FIG. 4 is a fragmentary, top plan view showing the details of the sweeper position locking control;

FIG. 5 is a fragmentary, perspective view showing the connection of the flexible tines to the sweeper hub;

FIG. 6 is a view taken along line 6—6 of FIG. 2;

FIG. 7 is a view taken along line 7—7 of FIG. 3;

FIG. 8 is a view taken along line 8—8 of FIG. 5; and

FIG. 9 is a fragmentary, side elevational view showing the adjustable handle employed for pushing the wheeled frame.

DESCRIPTION OF THE PREFERRED EMBODIMENT

Referring to the drawings, and more particularly to FIGS. 1 and 3, the leaf sweeper of the present invention comprises a wheeled main frame 1 and an engine support frame 2 pivoted on a vertical axis 3 to the wheeled main frame 1. A sweeper portion 4 having a plurality of flexible, rotary tines 5 is mounted on the forward end portion of the engine support frame 2, and an internal combustion engine 6 is mounted on the rearward portion thereof and a drive belt 7 is connected between the engine 6 and the tines 5 for rotating the tines. A steering linkage 8 is operatively connected between the wheeled main frame 1 and the engine support frame 2, and a locking control mechanism 9 is operatively connected between the wheeled main frame 1 and the steering linkage 8, whereby the sweeper portion 4 can be maintained in a desired position relative to the longitudinal axis of the wheeled main frame 1, as shown in FIG. 2.

The details of the construction of the wheeled main frame 1 are illustrated in FIGS. 3, 6 and 9, wherein it will be seen that a transverse frame member 10 is provided on each end thereof with a depending bracket 11 on which a stub axle 12 is mounted for supporting a wheel 13. The wheeled main frame 1 is provided with an upwardly inclined handle having a pair of spaced, tubular leg members 14 pivotally connected at their lower ends to the depending brackets 11 as at 15, the upper end portions of the leg members being interconnected by an integral, transversely extending tubular frame member 16. A transversely extending angle iron member 17 is rigidly secured to the upper end portions of the legs 14 in proximity to the handle portion 16 for not only reinforcing the handle but also to provide a support for a portion of the steering linkage 8 and locking control mechanism 9 to be described more fully hereinafter. As will be seen in FIG. 9, the inclination of the handle can be adjusted by means of a strut 18 having one end pivotally connected to the handle leg 14 as at 19, and the other end provided with a plurality of holes 20 for selectively receiving a removable pin extending through a hole 20 and aligned aperture provided in the bracket 11.

The details of the construction of the engine support frame 2 are illustrated in FIGS. 2, 3 and 7 wherein a pair of spaced, parallel longitudinally extending frame members 21 are provided at their distal ends with a transversely extending shaft 22 having a driven pulley 23 mounted thereon. The drive belt 7 extends around the driven pulley 23 and a drive pulley 24 on the output shaft of engine 6. The lower run of the drive belt 7 extends within the space between the longitudinally extending frame members 21. To facilitate the replacement of the belt 7, one of the frame members 21 is provided with a gap 25, as shown in FIG. 7, which is normally closed by a removable bridging plate 26, whereby the drive belt 7 can be replaced by inserting the lower run of the belt through the gap 25, as shown in phantom in FIG. 7. As will be seen in FIGS. 1 and 3, an idler pulley 27 engages the upper run of the drive belt 7 and is rotatably mounted on one end of a lever 28 having its opposite end pivotally connected to one of the longitudinally extending frame members 21 as at 29. A manually actuated handle 30 is connected to the end of the lever 28 whereby the handle can be pulled to lift the idler pulley 27 off of the drive belt 7, thereby releasing the tension on the drive belt 7, whereby rotation of the driven pulley 23 is interruped. By pushing the handle 30 forwardly, the idler pulley 27 resumes its position on the top run of the belt to thereby tension the belt, whereby a driving connection is established between the engine drive pulley 24 and the driven pulley 23.

As will be seen in FIGS. 2, 3 and 6, the pivotal connection 3 between the wheeled main frame 1 and the engine support frame 2 comprises a clevis-type connection including upper and lower apertured brackets 31 and 32 fixedly secured to the transversely extending frame 10 and extending longitudinally therefrom. The proximate end portions of the longitudinally extending frame member 21 are integrally connected to diametrically opposite sides of a sleeve 33 which is positioned between the upper and lower apertured brackets 31 and 32. The sleeve 33 and associated frame members 21 are held pivotaly connected to the apertured brackets by a depending pintle 34 extending through the upper bracket 31, sleeve 33, and lower bracket 32. The pintle 34 includes an extending flange portion on its head to provide a shelf or base support 35 for the engine 6.

Referring to FIGS. 3, 5 and 8, the sweeper portion 4 of the machine comprises a main tubular portion 36 adapted to be slidably mounted on the driven pulley shaft 22 and affixed thereon by suitable set screws 37. As will be seen in FIGS. 1 and 2, the driven pulley shaft 22 extends outwardly from the driven pulley hub on each side thereof; thus, a main tubular portion 36 is mounted on the respective extended end portions of the driven pulley shaft 22. Each tubular portion 36 is provided with a plurality of axially spaced, tubular sockets 38 extending radially outwardly therefrom, the sockets 38 being positioned so that one socket is oriented 90° from the next succeeding axially spaced tubular socket. Each tubular socket 38 is adapted to receive an end of a flexible tine 5 which is secured therein by a suitable fastener such as a bolt 39 extending through the socket 38, and tine 5, and secured therein by a nut 40. The tines 5 consist essentially of fan belts which have been cut to form the tines. The fan belts are manufactured to have permanent arcuate portions; thus, when cut, these arcuate portions 41 facilitate the sweeping action of the flexible tines 5 when the pulley 23 is being rotated in the direction of the arrow as shown in FIG. 3. The construction and arrangement of the main tubular portions 36 and tubular sockets 38 facilitate the replacement of the sweeper assembly on the driven shaft 22 and the individual tines within the respective sockets. To complete the structure of the sweeper portion 4, an arcuate hood 42 is positioned above the rotary tines 5 and is secured to the distal portions of the longitudinally extending frame member 21 by a pair of radially extending arms 43, and to the medial portions of the longitudinally extending frame members 21 by a transversely extending rod 44 extending therethrough.

The details of the construction of the steering linkage 8 are shown in FIGS. 1, 2 and 3, wherein a pair of vertically extending masts 45 are secured at their lower end portions to the longitudinally extending frame members 21. A transversely extending arm 46 is secured to the upper end portions of the masts 45, and the outboard ends of the arm have one end of a chain 47 connected thereto. The opposite ends of the chains 47 are connected to corresponding ends of a resilient, flexible belt 48 reeved around a pulley 49 rotatably mounted on a shaft assembly 50 secured to the angle iron 17. A suitable handle 51 is fixedly connected to the face of the pulley 49, whereby the sweeper portion 4 can be moved about the pivot connection 3 through an arc on either side of the longitudinal axis of the machine as shown in FIG. 2.

In order to hold the sweeper portion 4 in a desired direction relative to the longitudinal axis of the machine, the locking control mechanism 9, shown in FIGS. 2 and 4, is provided which comprises a ratchet wheel 52 integrally connected to the lower face of the pulley 49 and, therefore, rotatable therewith. A pair of pawls 53 and 54 are adapted to engage the toothed peripheral edge of the ratchet wheel, to thereby lock the steering pulley 49 in a fixed position. Pawl 54 is configured as a bell-crank lever pivotally connected as at 55 to a bracket 56 rigidly connected to the angle iron 17. While one leg of the pawl 54 engages the ratchet wheel 52, the other leg has one end of a tension spring 57 connected thereto as at 58, the opposite end of the tension spring 57 being connected to the angle iron 17, as at 59, whereby the pawl is normally biased into engagement with the ratchet wheel 52. A link 60 has one end pivotally connected as at 61 to the leg of pawl 54, and the opposite end pivotally connected as at 62 to the medial portion of pawl 53. While one end of the pawl 53 engages the toothed periphery of the ratchet wheel 52, the opposite end of the pawl is pivotally connected to the tubular handle bar portion 16 as at 63. A handle 64 is rigidly connected to the pawl 53. By the construction and arrangement of the locking control mechanism 9, to release the pulley 49 from the locked position, the handle 64 is pivoted in a direction toward the tubular handle portion 16, to thereby pivot the pawl 53 outwardly from the ratchet wheel 52. Simultaneously with the movement of pawl 53, the link 60 pulls the leg of pawl 54 causing the pawl to pivot away from the ratchet wheel 52 against the tension biasing force of the spring 57, whereby the pulley handle 51 can be manipulated to move the sweeper portion 4 to a desired orientation, whereupon the handle 64 is released and the pawls 53 and 54 are once again biased into locking engagement with the ratchet wheel 52.

In the operation of the leaf sweeper, the inclination of the handle bar 14, 16 will be first adjusted to accommodate the operator. The resilience of the flexible belt 48 compensates for the various inclinations of the handle. Handle 30 is positioned to lift idler pulley 27 from drive belt 7. The engine 6 is started and the idler pulley 27 is repositioned to engage the drive belt 7, whereby the driven pulley 23 and associated tines 5 are rotated in the direction of the arrow as shown in FIG. 3. The operator then pushes the wheeled frame 1 and rotating tines 5 to sweep leaves from the ground to form a pile for later pick-up and removal. While pushing the sweeper, the operator can place one hand around the locking control mechanism handle 64 and the tubular portion 16 of the wheeled main frame handle, and by squeezing the hand, the handle is pivoted to release the pawls 53 and 54 from engagement with the ratchet wheel 52. With the other hand, the operator can grasp the steering handle 51, to thereby move the sweeper portion 4 through an arc on either side of the longitudinal axis of the wheeled main frame 1, as shown in FIG. 2. If it is desired to hold the sweeper portion 4 in a desired orientation, the operator merely releases the handle 64, and the pawls 53 and 54 are spring-biased into engagement with the ratchet wheel 52.

While the leaf sweeper has been described as being pushed by the operator, it will be appreciated by those skilled in the art that it can be easily modified to be self-propelled by providing a power take-off from the engine 6 to the wheels 13.

From the above description, it will also be appreciated by those skilled in the art that the leaf sweeper of the present invention provides a machine which sweeps leaves at the speed of a leaf blower, while at the same time providing the scarifying effect of a manual rake by the flexible tines 5 brushing the ground.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A leaf sweeper comprising, a wheeled main frame having a longitudinal axis, said wheeled main frame comprising, a transverse frame member having a pair of ends, a depending bracket on each end of said transverse frame member, a stub axle mounted on each bracket, a wheel rotatably mounted on each stub axle, an upwardly inclined handle pivotally connected to the depending brackets, a strut, one end of the strut being pivotally connected to said handle, a plurality of longitudinally spaced holes provided in said strut, an aperture provided in one of said depending brackets, a removable pin extending through a selected hole in the strut and the aligned aperture in the bracket, whereby the inclination of the handle can be adjusted; means for pivotally connecting one end of said engine support frame so as to pivot about a vertical axis to said wheeled frame, a sweeper portion having a plurality of flexible, rotary tines mounted on the opposite end of said engine support frame, an engine having an output shaft mounted on the end portion of the engine support frame in proximity to said pivotal connection, a drive belt having an upper run and a lower run connected between said engine and said sweeper portion for rotating said flexible tines, a steering linkage operatively connected between said wheeled main frame and said engine support frame, whereby the engine support frame and associated sweeper portion can be pivoted about said vertical axis, to thereby move the sweeper portion through an arc on either side of the longitudinal axis of the wheeled frame, and a locking control mechanism operatively connected between the wheeled main frame and said steering linkage, whereby the sweeper portion can be maintained at a desired orientation relative to the longitudinal axis of said wheeled main frame.

2. A leaf sweeper according to claim 1, wherein the means for pivotally connecting the engine support frame to the wheeled main frame comprises, a pair of vertically spaced brackets connected to the transverse frame member and extending normal thereto, said brackets having aligned apertures, a vertically extending sleeve connected to said one end of the engine support frame, said sleeve being positioned between the vertically spaced apertured brackets, and a pintle extending through the brackets and sleeve, to thereby provide a clevis-type pivotal connection between the wheeled main frame and engine support frame.

3. A leaf sweeper comprising a wheeled main frame having a longitudinal axis, an engine support frame, means for pivotally connecting one end of said engine support frame so as to pivot about a vertical axis to said wheeled main frame, a sweeper portion having a plurality of flexible, rotary tines mounted on the opposite end of said engine support frame, an engine having an output shaft mounted on the end portion of the engine support frame in proximity to said pivotal connection, a drive belt having an upper run and a lower run connected between said engine and said sweeper portion for rotating said flexible tines; said engine support frame comrising a pair of spaced, parallel, longitudinally extending frame members, a transversely extending shaft rotatably mounted on said longitudinally extending frame members, a driven pulley having a hub and sides mounted on said shaft, said drive belt extending between a drive pulley on the output shaft of said engine and said driven pulley, the lower run of said drive belt being positioned within the spaced between the longitudinally extending frame members, a gap provided in one of said longitudinally extending frame members to facilitate removal and replacement of said drive belt, and a removable bridging plate normally closing said gap; a steering linkage operatively connected between said wheeled main frame and said engine support frame, whereby the engine support frame and associated sweeper portion can be pivoted about said vertical axis, to thereby move the sweeper portion through an arc on either side of the longitudinal axis of the wheeled main frame, and a locking control mechanism operatively connected between the wheeled main frame and said steering linkage, whereby the sweeper portion can be maintained at a desired orientation relative to the longitudinal axis of said wheeled main frame.

4. A leaf sweeper according to claim 3, wherein an idler pulley engages the upper run of the drive belt, a lever, said idler pulley being rotatably mounted on one end of said lever, the opposite end of said lever being pivotally connected to one of the longitudinally extending frame members, a manually actuated handle, one end of said manually actuated handle being connected to said one end of the lever, whereby by manually actuating the handle the idler pulley can be moved to engage or disengage the upper run of the drive belt to thereby vary the tension therein for starting and stopping the rotation of the driven pulley.

5. A leaf sweeper comprising a wheeled main frame having a longitudinal axis, an engine support frame, means for pivotally connecting one end of said engine support frame so as to pivot about a vertical axis to said wheeled main frame, a sweeper portion having a plurality of flexible, rotary tines mounted on the opposite end of said engine support frame, an engine having an output shaft mounted on the end portion of the engine support frame in proximity to said pivotal connection, a drive belt having an upper run and a lower run connected between said engine and said sweeper portion for rotating said flexible tines; said engine support frame comprising a pair of spaced, parallel, longitudinally extending frame members, a transversely extending shaft rotatably mounted on said longitudinally extending frame members, a driven pulley having a hub and sides mounted on said shaft, said drive belt extending between a drive pulley on the output shaft of said engine and said driven pulley; said sweeper portion comprising, a main tubular portion, a plurality of axially spaced tubular sockets extending radially outwardly from said main tubular portion, an end of a flexible tine inserted into each socket, a detachable fastener connecting each flexible tine into its respective socket, the driven pulley shaft having portions extending outwardly from the pulley hub on each side thereof, a pair of said main tubular portions and associated tubular sockets and flexible tines being mounted on the driven pulley shaft, and on each of the outwardly extending shaft portions on each side of the driven pulley, and set screws for detachably connecting each main tubular portion to its respective shaft portion; a steering linkage operatively connected between said wheeled frame, whereby the engine support frame and associated sweeper portion can be pivoted about said vertical axis, to thereby move the sweeper portion through an arc on either side of the longitudinal axis of the wheeled main frame, and a locking control mechanism operatively connected between the wheeled main frame and said steering linkage, whereby the sweeper portion can be maintained at a desired orientation relative to the longitudinal axis of said wheeled main frame.

6. A leaf sweeper according to claim 5, wherein the flexible tines are constructed from fan belts having permanent arcuate portions, the fan belts being cut to form the tines having the arcuate portions, to thereby enhance the sweeping action of the tines.

7. A leaf sweeper according to claim 5, wherein an arcuate hood is connected to the engine support frame and positioned over the rotary tines.

8. A leaf sweeper according to claim 7, wherein the locking control mechanism comprises a ratchet wheel having a toothed peripheral edge integrally connected to said pulley on the handle and rotatable therewith, and a pawl assembly operatively connected between the ratchet wheel and the handle of the wheeled main frame.

9. A leaf sweeper according to claim 8, wherein the pawl assembly comprises, a pair of pawls adapted to engage the toothed peripheral edge of the ratchet wheel, to thereby lock the pulley on the handle in a fixed position, one pawl being pivotally connected to the handle of the wheeled main frame, a tension spring connected between said pawl and said handle for biasing the pawl into engagement with said ratchet wheel, the other pawl being pivotally connected to said handle, a link extending between said pawls and being pivotally connected thereto, a handle connected to said other pawl, whereby the pawls are simultaneously moved out of engagement with said ratchet wheel when the pawl handle is pivoted in a direction toward the handle of the wheeled main frame.

10. A leaf sweeper comprising a wheeled main frame having a longitudinal axis and a handle, an engine support frame, means pivotally connecting one end of said engine support frame so as to pivot about a vertical axis to said wheeled main frame, a sweeper portion having a plurality of flexible rotary tines mounted on the opposite end of said engine support frame, an engine mounted on the end portion of the engine support frame in proximity to said pivotal connection, a drive belt connected between said engine and said sweeper portion for rotating said flexible tines, a steering linkage operatively connected between said wheeled main frame and said engine support frame, whereby the engine support frame and associated sweeper portion can be pivoted about said vertical axis, to thereby move the sweeper portion through an arc on either side of the longitudinal axis of the wheeled main frame; said steering linkage comprising a mast having an upper end portion and a lower end portion, the lower end portion of said mast being connected to the engine support frame, a transversely extending arm secured to the upper end portion of the mast, a pulley rotatably mounted on the handle of the wheeled main frame, a flexible, resilient belt reeved around said pulley, each end of said belt being connected to a respective end of the transversely extending arm, a handle connected to said pulley for turning said pulley, whereby upon turning said pulley the engine support frame is caused to move about the pivotal connection, and a locking control mechanism operatively connected between the wheeled main frame and said steering linkage, whereby the sweeper portion can be maintained at a desired orientation relative to the longitudinal axis of said wheeled main frame.

* * * * *